United States Patent [19]

Whittington et al.

[11] Patent Number: 5,277,688
[45] Date of Patent: Jan. 11, 1994

[54] AUTOMATED ROBOTIC QUICK CHANGE FORCE CONTROLLED ARBOR DEVICE

[75] Inventors: Glenn A. Whittington, Lino Lakes; Steven J. Austin, Minneapolis; Roy Oakes, Roseville, all of Minn.

[73] Assignee: Robotics and Automation Corporation, Fridley, Minn.

[21] Appl. No.: 923,601

[22] Filed: Aug. 3, 1992

[51] Int. Cl.⁵ .............................................. B23Q 3/157
[52] U.S. Cl. .................................... 483/33; 51/165.87; 211/1.55; 483/61; 483/63
[58] Field of Search .................. 483/33, 60, 61, 62, 483/63, 64, 13, 10, 11; 211/1.52, 1.53, 1.54, 1.55, 1.57, 96, 168; 279/4.02; 51/165.87

[56] References Cited

U.S. PATENT DOCUMENTS

| | | | |
|---|---|---|---|
| 2,736,628 | 2/1956 | Fadden, Jr. | 211/1.55 X |
| 3,627,490 | 12/1971 | Osano | 51/165.87 |
| 3,913,277 | 10/1975 | Hahn et al. | 51/165.87 X |
| 3,925,878 | 12/1975 | Kikuchi | 483/33 |
| 4,412,766 | 11/1983 | Eckstein | 279/4.02 |
| 4,551,902 | 11/1985 | Thibaut | 483/33 |
| 4,584,759 | 4/1986 | Bleich | 483/66 X |
| 4,712,289 | 12/1987 | Stamm et al. | 483/33 X |
| 4,712,470 | 12/1987 | Schmitz | 51/165.87 X |
| 4,802,274 | 2/1989 | Petrof et al. | 483/10 |
| 5,088,604 | 2/1992 | Baur et al. | 211/1.55 |

FOREIGN PATENT DOCUMENTS 0199765 8/1989 Japan ............................ 51/165.87

Primary Examiner—Z. R. Bilinsky
Attorney, Agent, or Firm—Leo Gregory

[57] ABSTRACT

An automated robotic quick change force controlled arbor device particularly to apply a sanding disk to surface finish metal and an automatic replacement of the disk.

5 Claims, 5 Drawing Sheets

AUTOMATED ROBOTIC QUICK CHANGE FORCE CONTROLLED ARBOR DEVICE

BACKGROUND OF THE INVENTION

1. Field of Invention This invention relates to a force controlled polishing device, having an automatic quick change arbor, for surface finishing metals.

2. Description of the Previous Art

Surface finishing of metal traditionally has been a manual work effort using, for example power operated grinding and polishing equipment wherein the finished surfacing results from the application of the workers skill.

Further the hand operation requires the worker to operate in a dust laden atmosphere. Also the repetitive motion of applying the surface finishing tool has resulted in many workers developing Carpal Tunnel Syndrome.

SUMMARY OF THE INVENTION

It is desirable and an object herein to automate the work of finishing or polishing metal surfaces.

It is a particular object to have an automated robot perform the finishing of metal surfaces by applying a regulated force to achieve uniform results.

It is also an object herein to provide a robot control program to vary the polishing pressure as required by means of a signal to a computer controlled air pressure regulator to apply the desired pneumatic pressure to the polishing tool.

Another object of this invention is to provide a feeder system to automatically provide and replace polishing disk pads to the surface finishing apparatus.

It is also an object herein to provide for the disposition of a replaced polishing disk pad in a recycling container.

These and other objects and advantages of the invention will be set forth in the following description made in connection with the accompanying drawings in which like reference numerals refer to similar parts throughout the several views.

DESCRIPTION OF A PREFERRED EMBODIMENT

Figure 1:
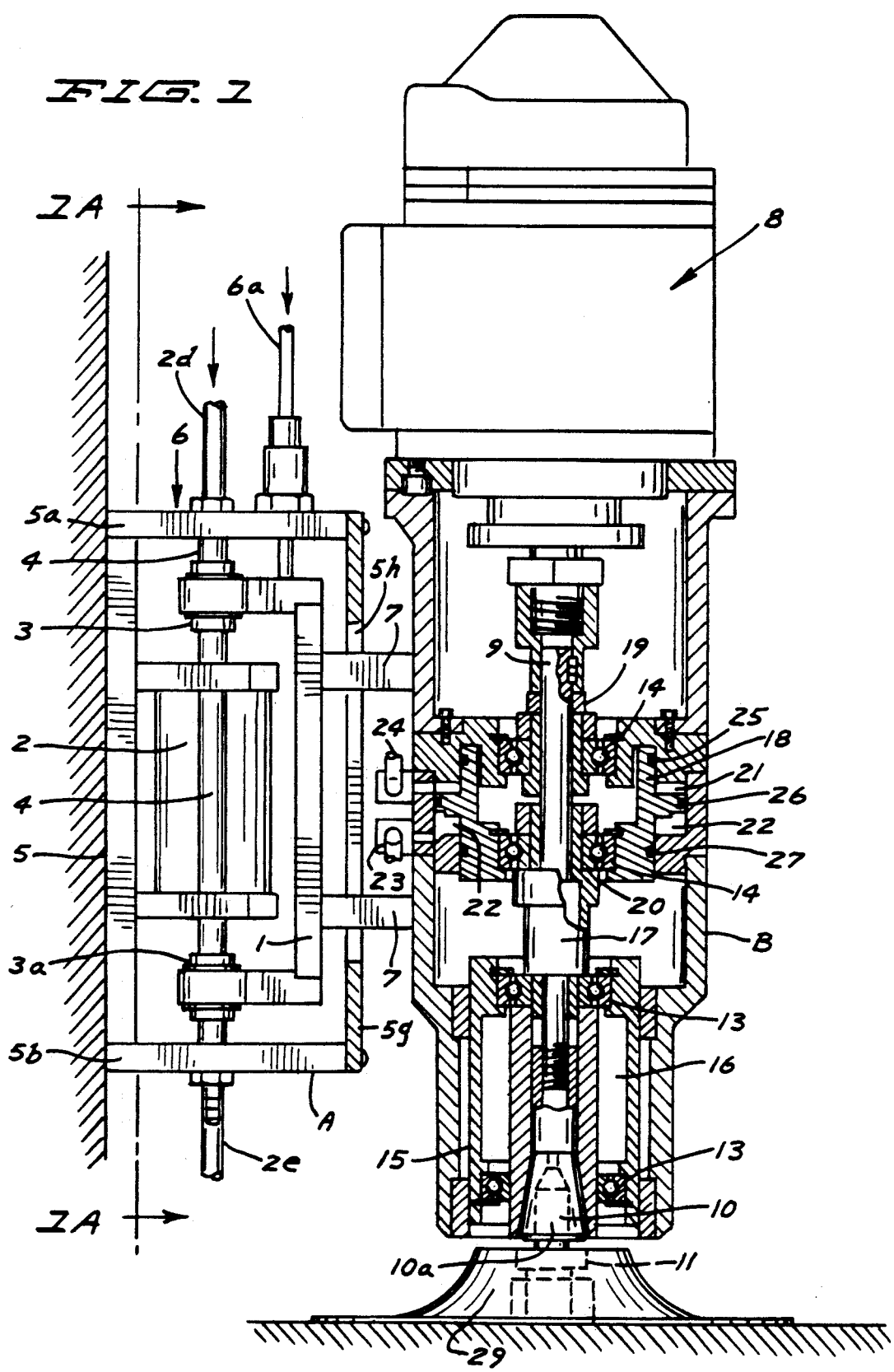
FIG. 1 is a view for the most part in vertical section.
Figure 1A:
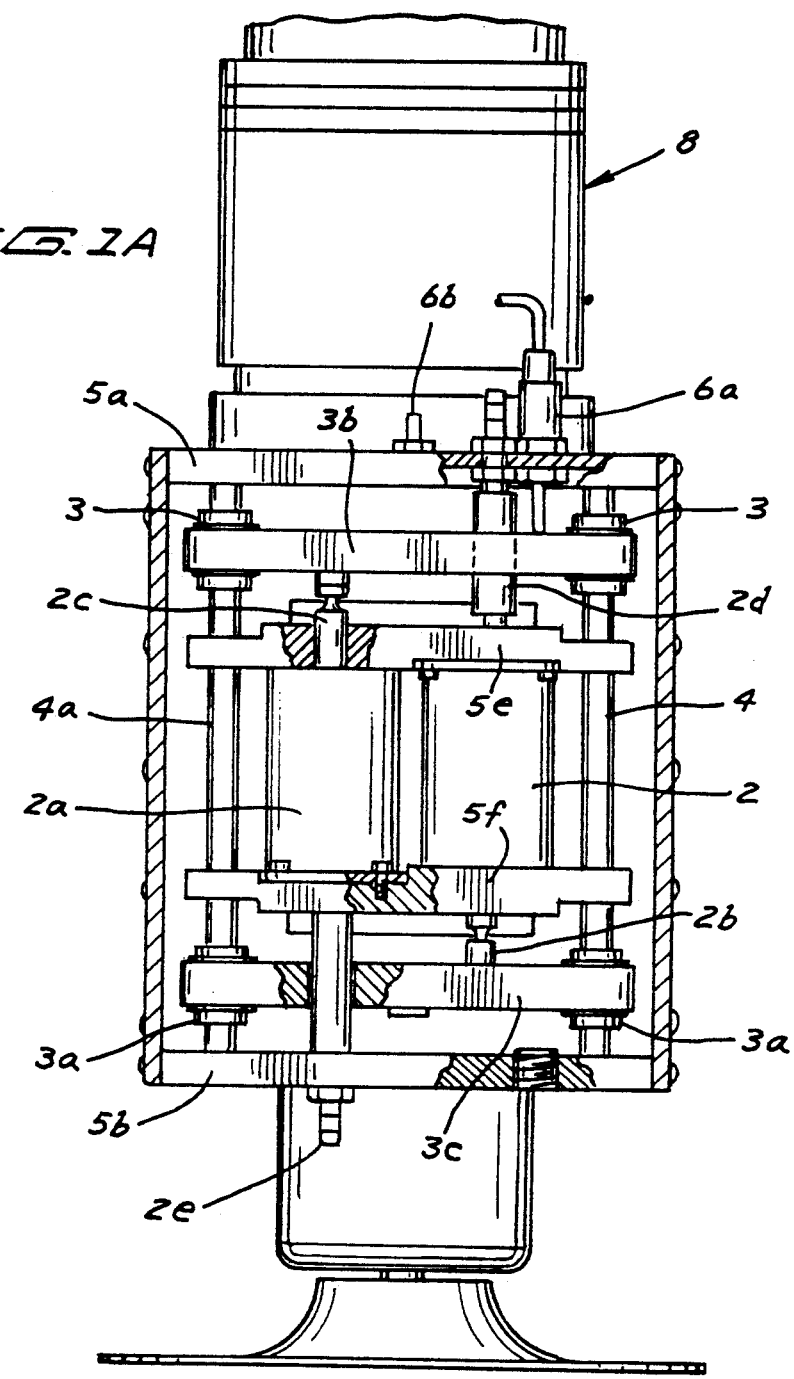
FIG. 1A is a view in vertical section taken on line 1A—1A as indicated.

To be described herein is an automated robotic quick change arbor force controlled sanding and finishing or polishing apparatus comprising a motorized abrasive disk device B which is connected with and supported by robot arms 7 to a sliding member apparatus A which is capable of exerting or applying a controlled force at any point within the limits of travel of the sliding member thereof.

The controlled force apparatus A embodies two low friction breakaway conventional air operated cylinders 2 and 2a as shown in a side by side parallel arrangement supported suitably between the spaced walls 5e and 5f upstanding from a base or mounting plate 5 all within and a part of a housing 6 to be further described.

Supported by said walls 5e and 5d are a pair of transversely spaced parallel shafts 4 and 4a which extend to the end walls 5a and 5b of said housing.

At either outer side of said walls 5c and 5d mounted on said shafts 4 and 4a respectively are bearing assemblies 3 and 3a. Said bearing assemblies are adapted to be slidable axially of their respective shafts.

Extending between said bearing assemblies and upstanding therefrom are bearing plates 3b and 3c and supported by said bearing plates and extending therebetween is a sliding member having upstanding mounting blocks 7 upon which suitably mounted or secured is the polishing apparatus B to be described.

The cylinders 2 and 2a have their respective pistons 2b and 2c secured in a suitable manner to the opposing bearing plates 3b and 3c.

The cylinder 2a by means of its appropriate air port 2d and the cylinder 2 by means of its appropriate air port 2e are connected with controlled air pressure sources not here shown.

Connected to the upper end wall 5a and extending therethrough to engage the bearing plate 3b is a sensor connector 6a which when in operation is connected with a sensor (not shown) to indicate the completion of the application of a pressure cycle. This would be preset for any given job and likely would be more accurate than the use of personal judgement.

The entire assembly described in connection with the housing 6 is enclosed therein, except for the sliding member extending thereabove from within said housing. By means of a positive pressure air fitting 6b through which is provided a positive low pressure air flow to be moving through and out of the interior of said housing, there is prevented the induction and entrapment of dust and residue from grinding which, if allowed to accumulate, would adversely affect the low friction characteristics of operating elements within the housing.

With reference to the top wall, 5g of said housing 6 through which the mounting blocks 7 extend, the longitudinal space 5h in said wall is shown extending to limits which determine the longitudinal extent of movement of said sliding plate 1 as supported by the mounting blocks 7.

With a controlled air supply charging cylinder 2, the piston 2b moves the bearing assemblies 3a forwardly on the shafts 4 and 4a, thus sliding into operating position the polishing apparatus B carried by the plate member 1. At the same time, the cylinder 2a has for its purpose to counterbalance or offset the effect of the weight of said polishing apparatus on said cylinder 2. The piston 2c of the cylinder 2a acting on the bearing plate 3b retracts or bears against the bearing plate 3b to offset the weight of or gravity pull on the polishing apparatus and thus, in effect, providing a lifting action on the sliding plate member compensating for the weight of the abrasive unit.

As here shown, the mounting plate 5 is indicated as being mounted onto a vertical support and positioned for the polishing apparatus to be suitably mounted. Though not here shown, said mounting plate may be attached to a bracket whereby the polishing apparatus may be positioned other than vertically for any particular job requirement.

The automatic abrasive disk arbor changing apparatus is comprised of an outer collet housing 15 containing attached top and bottom bearings 13 permitting an inner collet housing 16 to rotate relative to the outer collet housing 15.

The interior wall of the inner collet housing 16 radially encloses the axial sliding collet 10. The collet 10 has a flared end portion comprised of first, second and third tool gripping members, such as indicated at 10a, separated by longitudinal slots extending beyond the flared portion of the collet body. The gripping members are in an open position for insertion or removal of the tool arbor 11. The gripping members, which are not unlike fingers, are sufficiently flexible to be in a closed retaining position where the inner collet housing 16 is forcibly extended longitudinally over the collet 10 from a force applied by means of a piston shaft 17 in turn secured to piston 18 and the inner portion of a bearing assembly 20 by a nut 19, allowing rotation of a piston 17 with respect to piston 18 yet transmitting the longitudinal force applied by piston 18 that is generated in the pneumatic pressure applied through orifices 23 and 24 and contained by seals 25, 26 and 27. Pressure applied through orifice 23 applies pneumatic force through chamber 21 to retract the inner collet housing 16 from the flared gripping members of collet 10 relaxing the segmented tool gripping members facilitating the removal or insertion of tool arbor 11. Pressure applied through orifice 24 applies pneumatic force from chamber 22, extending the inner collet housing 16 over the collet 10 flared segmented tool gripping members compressing said members applying gripping force to the tool arbor 11. For specific detailed description reference is had to U.S. Pat. No. 4,784,421 assigned to Mecanotran Corporation, a predecessor to the present assignee.

Figure 2:
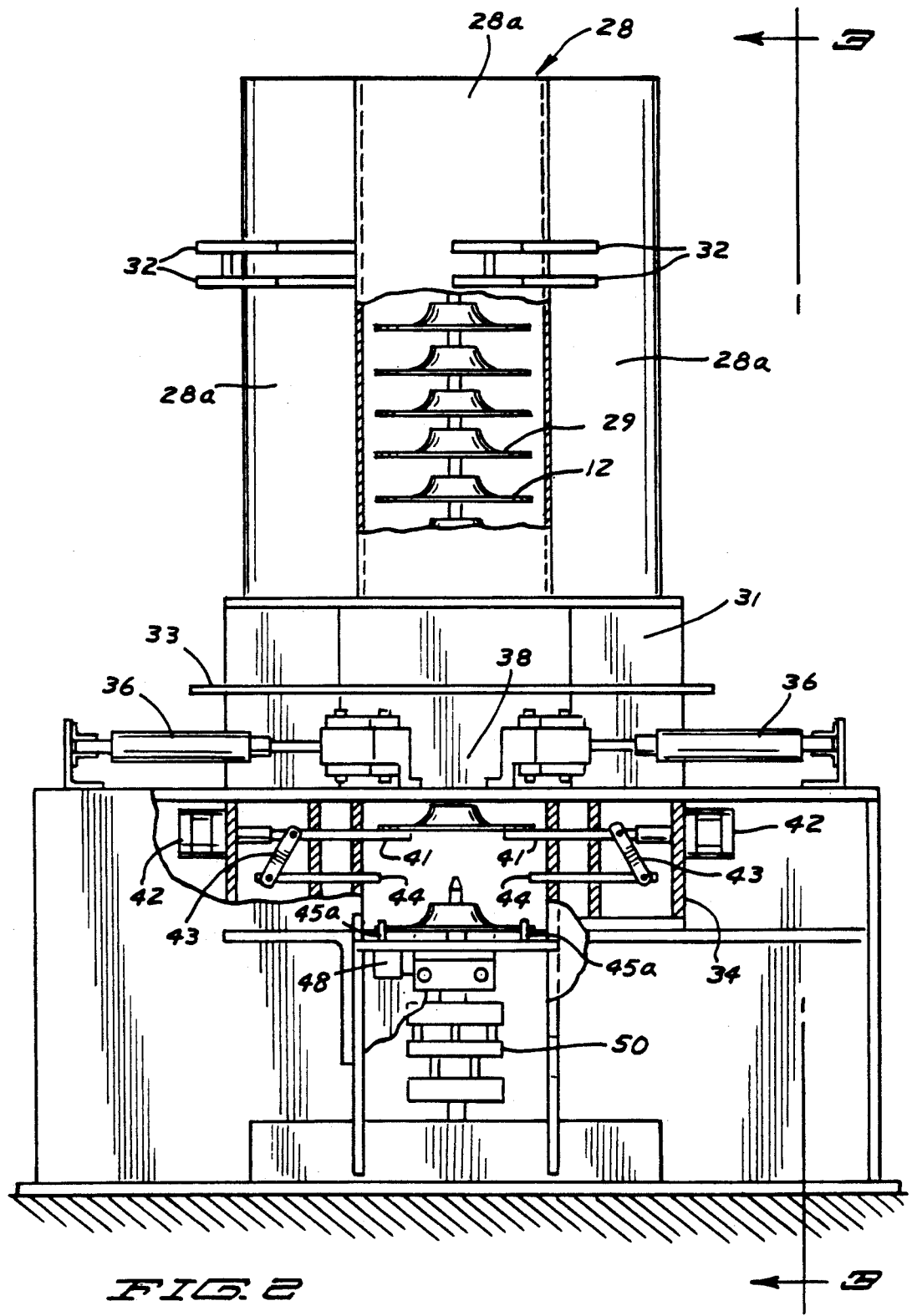
FIG. 2 is a view in front elevation with some parts broken away and some parts in vertical section.

An automatic feeder apparatus 28 of unused arbor mounted abrasive disk pads is seen in FIG. 2. The arbor mounted abrasive disk pads 29 mounted therein are provided to the feeder apparatus in tubular magazines 28a containing them stacked and nested.

Figure 6:
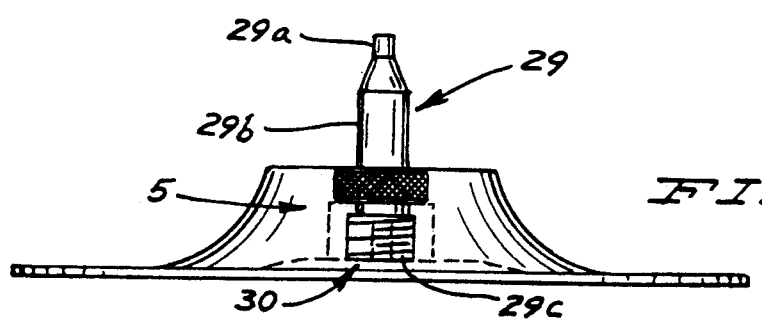
FIG. 6 is a view in side elevation of an element of the structure.

The arbor mounted disk pad 29, FIG. 6, includes a reduced diameter portion 29a on the end of its arbor 29b that is inserted into the collet 10 of the apparatus of FIG. 1. The lower end of the arbor 29c that is attached to the disk pad 29e contains a hole 30 sized to contain the reduced diameter section 29a of the next adjacent disk pad arbor in the stack, the length of the reduced diameter section 29a being of sufficient length and hole 30 being of sufficient depth to provide adequate engagement of the mating diameters to prevent misalignment or canting of the disk pad when stacked in a tubular magazine 28a.

The feeder apparatus contains provisions for three or more of the tubular magazines 28a positioned with the lower end inserted in the magazine sleeve 31 and the upper end being within upper support 32. The above represents an assembly of conventional structure and further description is not deemed necessary.

Figure 4:
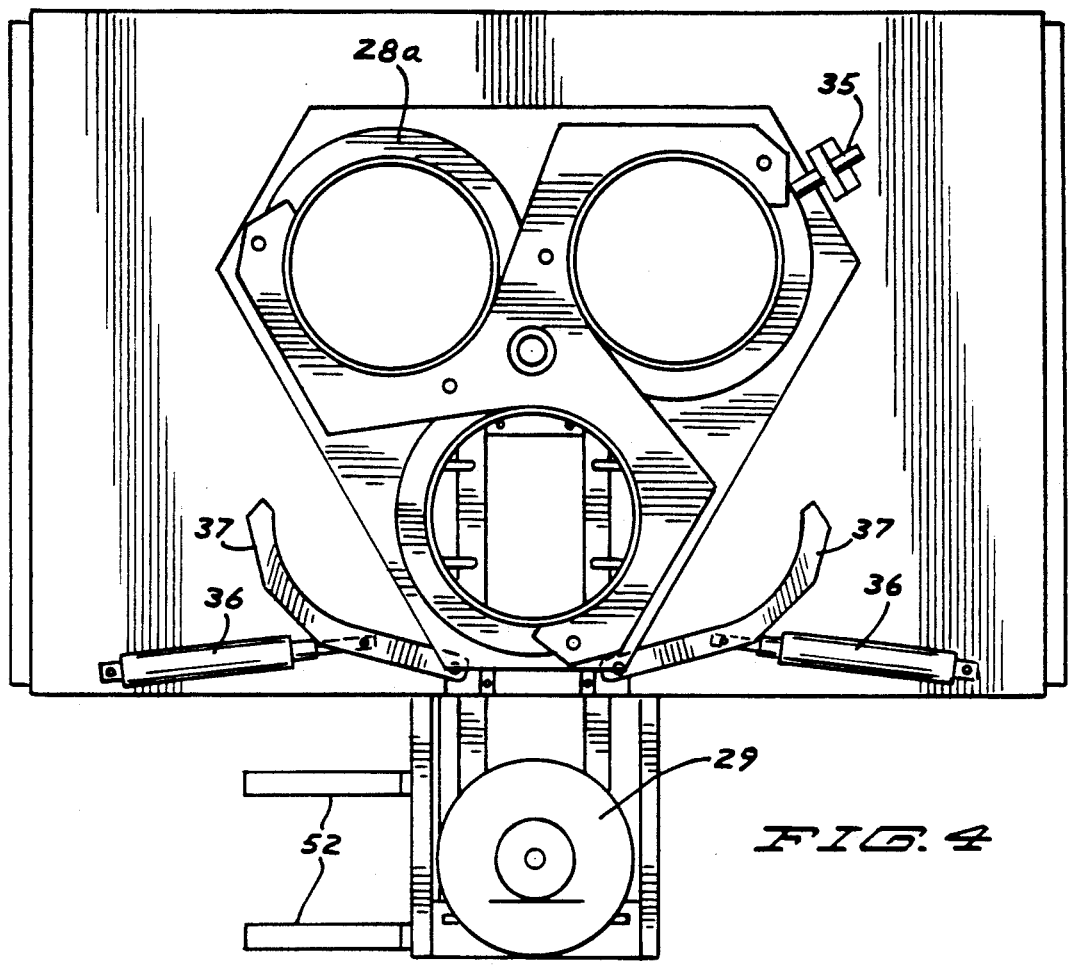
FIG. 4 is a top plan view.
Figure 5:
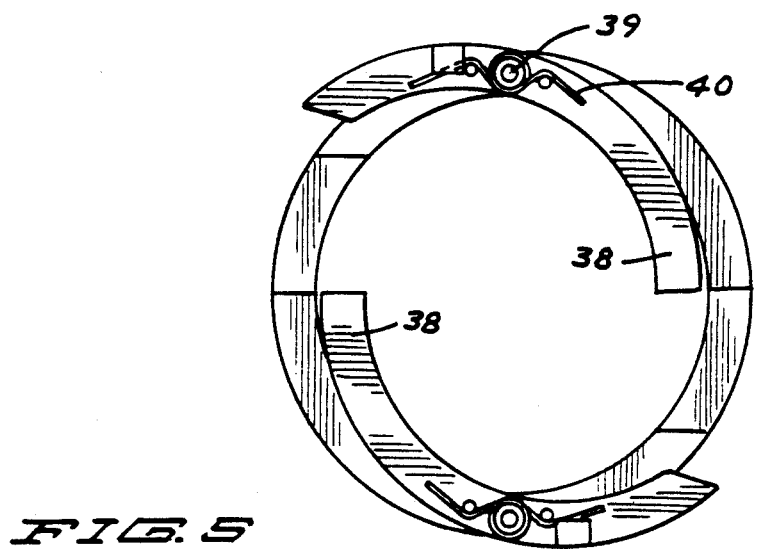
FIG. 5 is a view partially in perspective of a detail of the structure.

Upon initiating the operating sequence, a magazine indexing plate 33 moves the positioned tubular magazines as to align one magazine with an escapement mechanism 34. A magazine position sensor 35 (FIG. 4) indicates positioning motion completion and signals (not shown) for pneumatic pressure to be applied to magazine sleeve clamp pneumatic piston cylinders 36 moving the magazine sleeve clamps 37 to a position such that a tubular magazine 28a is clamped in alignment with escapement mechanism 34, simultaneously applying force to disk retaining apparatus 38 (FIG. 2) with force sufficient to rotate a disk retaining lever 38a (FIG. 5) about a pin 39 to overcome the applied force of a position retaining spring 40 allowing the stacked arbor mounted disk pad with attached abrasive to drop to a feeder escapement disk retainer 41 (FIG. 2). The control system causes pneumatic pressure to be applied to a pneumatic piston cylinder 42 moving the cylinder piston in turn attached to a feeder escapement apparatus 43, retracting disk retainer 41 and extending secondary disk retainer 44. The pneumatic pressure on the pneumatic piston cylinder 42 is reversed, reversing the motions of the disk retainer and secondary disk retainer, allowing the arbor disk on the secondary disk retainer to drop into a position on rails 53 in front of positioning pins 45 concurrent with an arbor disk pad dropping to the disk pad retainer 41 from the disk pad tubular magazine 28a.

Figure 3:
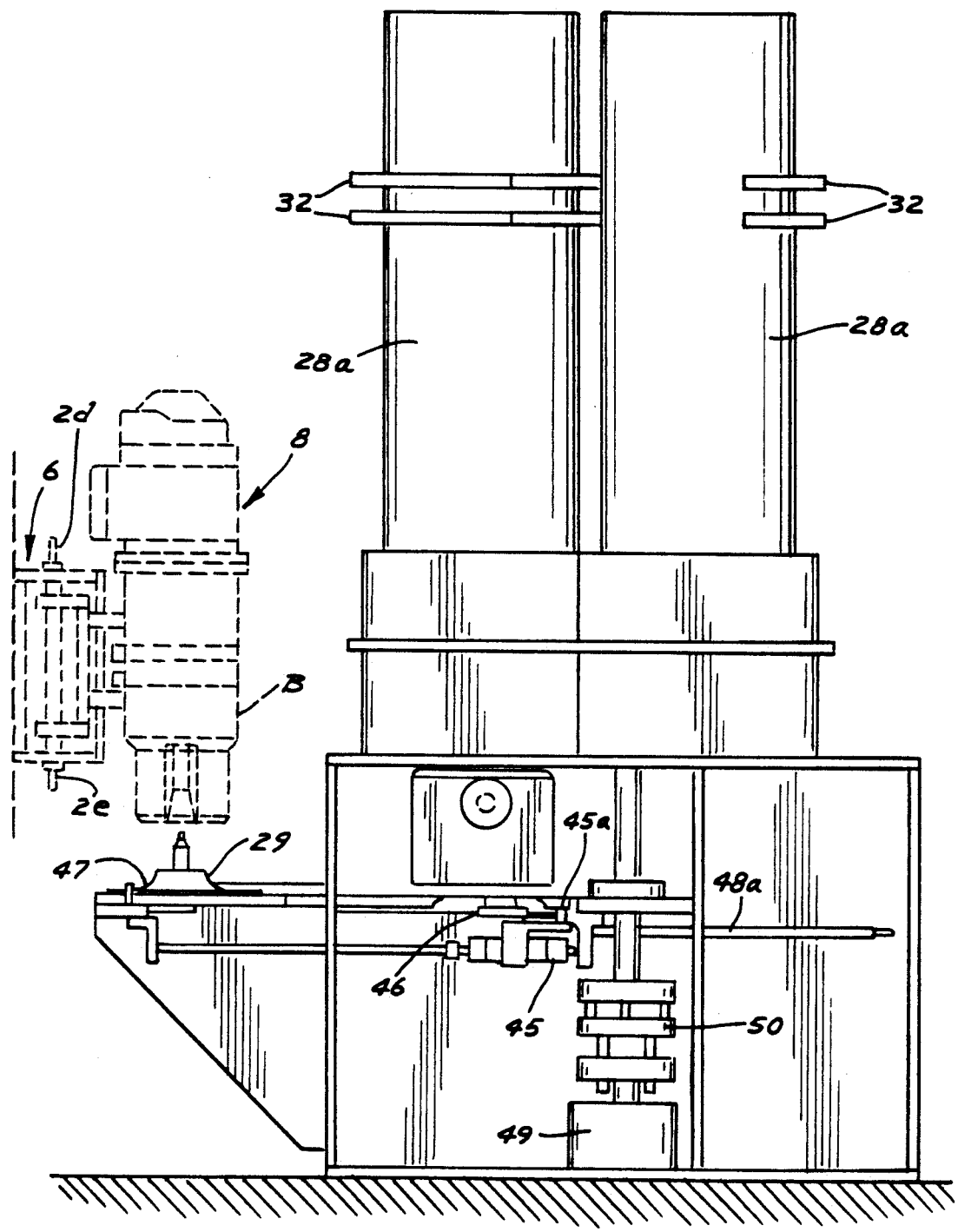
FIG. 3 is a view in elevation taken on line 3—3 of FIG. 2 as indicated.

A position ready sensor 46 (FIG. 3) is located adjacent positioning pins 45a to detect when an arbor disk pad has been positioned for attachment to arbor 11. The signal from the position ready sensor 46 allows a feed ready sensor 47 to signal for application of pneumatic piston cylinder 48 with the piston rod 48a attached to positioning pins 45, extended, moving the arbor disk to the feed ready position until the feed ready sensor 47 detects the arbor disk in attached position and provides a correct position signal that reverses the applied pneumatic pressure on the feeder pneumatic piston, returning the positioning pins to their starting position, repeating the above sequence initiated by the position ready sensor 46 until the arbor abrasive disk pads contained in the tubular magazine 28a positioned in the escapement mechanism have been used up. In connection therewith are a pair of steadying or support arms 52.

When the arbor disk is in feed ready position, the arbor 11 of the polishing apparatus, having released its used arbor disk, is positioned to receive the ready disk with the operation of the collet 16 as has been described.

Upon a signal from said position ready sensor 46 indicating no presence of an arbor disk, the pneumatic pressure on the clamp pneumatic piston 36 is reversed, opening clamps 37 releasing the tubular magazine 28, actuating a pneumatic rotary actuator 49 (FIG. 3) attached to a ratchet mechanism 50 in turn attached to the indexing plate 33 which indexes the tubular magazine until a loaded magazine is detected by said position sensing 46.

The separate elements herein for the most part are conventional in structure and the description provided of their cooperative action is deemed fully adequate for one learned in this art.

It will of course be understood that various changes may be made in the form, details, arrangement and proportions of the product without departing from the scope of the invention, which, generally stated, consists in a product capable of carrying out the objects above set forth, in the parts and combination of parts disclosed and defined in the appended claims.

What is claimed is:

1. An automated robotic force controlled force polishing apparatus, having in combination
   a polishing apparatus,
   an arbor mounted abrasive disk carried by said apparatus, sliding means supporting said apparatus, a controlled power source operating said sliding means, means carrying a plurality of stacks of said disks, a disk escapement mechanism in connection with a disk retainer.

means aligning a stack of said disks with said escapement mechanism, a sensor indicating a completion of said alignment, said sensor causing said escapement mechanism to release a disk to said retainer, and means causing said apparatus to receive said disk as a replacement for said released disk.

2. The structure of claim 1, wherein said sliding means comprises a pair of air operated cylinders, a housing, said cylinders disposed in said housing in a side by side arrangement, a pair of upstanding walls within said housing supporting said cylinders, a pair of transversely spaced shafts extending parallel to said cylinders respectively outwardly thereof extending through said upstanding walls, a bearing assembly adjacent each of the ends of said shafts, a bearing plate extending between each of the transversely opposed of said bearing assemblies, a sliding plate member, mounting blocks upstanding from said bearing plates supporting said sliding plate member and said sliding plate member supporting said polishing apparatus, a top wall of said housing having an elongated opening therein, said mounting blocks extending through said opening having longitudinal movement therein, said cylinders having pistons respectively secured to said bearing plate, one of said cylinders having its piston moving a bearing plate with its respective bearing assemblies and the sliding plate supported thereby, and the others of said cylinders retracting the other of said bearing plates and the bearing assemblies related thereto counterbalancing the weight of said polishing apparatus in its vertical position.

3. The structure of claim 1, wherein arbor having said abrasive disk releasably mounted therein, an inner collet having tool gripping fingers to engage the arbor of said abrasive disk, a collet enclosing said inner collet enclosing to apply a gripping force to said fingers or being withdrawn therefrom to release said fingers, and mean including pneumatic pressure operating said collet.

4. The structure of claim 1, wherein said sliding means comprises a housing, a pair of air cylinders in said housing in parallel arrangement, means supporting said cylinders, a pair of shafts parallel to and respectively outwardly of said cylinders extending through and supported by said supporting means, said shafts supporting bearing assemblies adjacent their ends and slidable thereon, the transverse pairs of said bearing assemblies having bearing plates therebetween, means supporting said polishing apparatus being supported by said bearing plates, said cylinders respectively having their pistons secured to opposite of said bearing plates, a controlled pressure air supply respectively operating each of said cylinders, whereby one of said cylinders moves a bearing assembly and said sliding member and the other of said cylinders offsets the weight of said polishing apparatus by retracting its piston.

5. A polishing disk feeding apparatus in connection with a polishing apparatus, comprising a plurality of tubular magazines having their lower ends inserted into a magazine sleeve, an escapement mechanism carried by said apparatus, an indexing plate aligning a magazine with said escapement mechanism, a disk retainer, a magazine position sensor indicating that said alignment is completed, an arbor disk in a feed ready position, and means signaling such a position.

* * * * *